(12) United States Patent
Sawaguchi et al.

(10) Patent No.: US 7,741,973 B2
(45) Date of Patent: Jun. 22, 2010

(54) DRIVE CONTROL DEVICE

(75) Inventors: Masahiro Sawaguchi, Atami (JP); Hazime Endou, Izunokuni (JP); Masahiro Gotoh, Fujinomiya (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 254 days.

(21) Appl. No.: 11/942,233

(22) Filed: Nov. 19, 2007

(65) Prior Publication Data

US 2008/0117069 A1    May 22, 2008

(30) Foreign Application Priority Data

Nov. 20, 2006    (JP) .............. 2006-313402

(51) Int. Cl.
    *G08B 21/00* (2006.01)
(52) U.S. Cl. .................. 340/648; 362/800; 324/76.11; 324/378
(58) Field of Classification Search ........... 340/635, 340/648, 650, 815.4, 815.45; 342/403, 414, 342/378, 397, 78.11; 362/800
    See application file for complete search history.

(56) References Cited

U.S. PATENT DOCUMENTS

| | | | |
|---|---|---|---|
| 4,642,616 A * | 2/1987 | Goodwin ............... | 340/654 |
| 4,642,618 A * | 2/1987 | Johnson et al. ........ | 340/683 |
| 4,696,277 A * | 9/1987 | Katayama ............. | 123/479 |
| 5,019,799 A * | 5/1991 | Oshiage et al. ........ | 340/438 |
| 5,512,883 A * | 4/1996 | Lane, Jr. .............. | 340/648 |
| 5,657,193 A * | 8/1997 | Purkayastha .......... | 361/23 |
| 5,726,627 A * | 3/1998 | Kane et al. ........... | 340/531 |
| 6,112,148 A * | 8/2000 | Baraban et al. ........ | 701/107 |
| 6,148,258 A * | 11/2000 | Boisvert et al. ....... | 701/99 |
| 6,757,638 B2 * | 6/2004 | Sokac et al. .......... | 702/179 |
| 2003/0222615 A1 | 12/2003 | Aono et al. | |
| 2004/0149831 A1 * | 8/2004 | Sheeran et al. ........ | 236/12.1 |

FOREIGN PATENT DOCUMENTS

| | | |
|---|---|---|
| CN | 1462914 | 12/2003 |
| JP | 7311617 | 11/1995 |
| JP | 2002-326267 | 11/2002 |

(Continued)

OTHER PUBLICATIONS

English Abstract of JP-2004-005218.

(Continued)

*Primary Examiner*—Davetta W Goins
*Assistant Examiner*—Edny Labbees
(74) *Attorney, Agent, or Firm*—DLA Piper LLP (US)

(57) ABSTRACT

A drive control device that includes: a driving circuit to drive a driving source; a condition detector to detect the condition of at least one of the driving source and the driving circuit to output a condition signal thereof; a controller to control the driving circuit based on the condition signal; an alarm detector to detect an occurrence of an alarm based on the condition signal; an alarm code generator to analyze the alarm detected by the alarm detector to generate an alarm code; and an alarm display to display the alarm code generated by the alarm code generator, in which the alarm display includes one or more lighting section to display the alarm code by a lighting pattern of the lighting section.

3 Claims, 5 Drawing Sheets

FOREIGN PATENT DOCUMENTS

| | | |
|---|---|---|
| JP | 2004-005218 | 1/2004 |
| JP | 2006-141136 | 6/2006 |

OTHER PUBLICATIONS

English Abstract of JP-2006-141136.
English Abstract of JP-2002-326267.
Office Action issued in Chinese Appl 200710199941 on Oct. 16, 2009.
Partial English Language Translation of Chinese Office Action issued in Appl 200710199941 on Oct. 16, 2009.
English Language Abstract of CN 1462914 published Dec. 24, 2003.
English Language Abstract of JP 7311617 published Nov. 28, 1995.

* cited by examiner

FIG. 3

DRIVE CONTROL DEVICE

BACKGROUND OF THE INVENTION

1. Field of the Invention

The present invention relates to a drive control device. More specifically, it relates to a drive control device to control current applied to a motor based on signals from an encoder for detecting the rotation speed of the motor.

2. Description of Related Art

Conventionally, a drive control device to control the driving state of a motor has been well known. (For example, a document: JP-A-2004-5218)

Such a drive control device includes, for example, a motor to be controlled, an encoder to detect the rotation speed of the motor and output a condition signal, and a drive controller to control current applied to the motor to achieve a desired rotation speed of the motor based on the condition signal from the encoder.

Such a drive control device may be provided with a function to detect and inform malfunction of each component of the device in a form of alarm. For example, a function to detect and inform that the rotation speed of the motor detected by the encoder exceeds the permissible rotation speed of the motor in a form of alarm can be provided. Defects of the motor can be prevented by such a drive control device.

Since a variety of malfunctions of each component of the drive control device can be assumed, an alarm code for indicating the cause of an alarm (i.e. the detail of a malfunction) is generated and sent together with the alarm when the alarm is sent. This feature allows specifying the cause of the alarm and dealing with the alarm with ease.

However, such a conventional drive control device required a costly display unit such as a seven-segment display in order to distinguishably display different alarm codes corresponding to various causes of alarms. The drive control device may be provided with external equipments that read internal information of the drive control device and display alarm codes upon occurrence of malfunctions instead of being provided with the display unit, however, it is disadvantageous in its workability since it requires external equipments to be connected.

SUMMARY OF THE INVENTION

An object of the present invention is to provide an inexpensive drive control device that can distinguishably display various alarm codes without being connected to external equipments such as a computer.

A drive control device according to an aspect of the present invention includes: a driving circuit to drive a driving source; a condition detector to detect the condition of at least one of the driving source and the driving circuit to output a condition signal thereof; a controller to control the driving circuit based on the condition signal; an alarm detector to detect the occurrence of the alarm based on the condition signal; an alarm code generator to analyze the alarm detected by the alarm detector to generate the alarm code; and an alarm display to display the alarm code generated by the alarm code generator, in which the alarm display includes one or more lighting section to display the alarm code by a lighting pattern of the lighting section.

According to the aspect of the present invention, since the drive control device includes the alarm detector to detect an occurrence of an alarm based on the condition signal, the alarm code generator to analyze the alarm detected by the alarm detector to generate an alarm code and the alarm display to display the alarm code generated by the alarm code generator, operators can specify the cause of the alarm based on the alarm code displayed on the alarm display so as to deal with the alarm with ease.

Further, since the alarm display includes one or more lighting section to display an alarm code based on the lighting pattern of the lighting section, there is no need for the drive control device to be connected to external equipments to display alarm codes and to be provided with a costly display unit such as a seven-segment display. Accordingly, the drive control device according to the aspect of the present invention is advantageous in its workability. Further, it can be inexpensively produced.

In the above arrangement, the alarm code is preferably a natural number of one or more, the lighting section is preferably lighted with the lighting pattern corresponding to the alarm code to inform the alarm code after being lighted with another predetermined lighting pattern that indicates the occurrence of the alarm, and the lighting section may flicker only a number of times corresponding to the natural number of the alarm code to inform the alarm code.

According to the above arrangement, alarm codes are natural numbers of one or more and the lighting section flickers a number of times corresponding to the natural number of the alarm code (inform-lighting that informs the alarm code) after the lighting section is lighted with the predetermined lighting pattern to signal the occurrence of the alarm. Accordingly, operators can be informed with the occurrence of the alarm by the signal-lighting and then can be informed with the alarm code by the number of times of flickering of the inform-lighting following the signal-lighting.

In the above arrangement, the alarm display may include a plurality of the lighting sections, each of the lighting sections may correspond to each digit of the natural number of the alarm code, and each of the lighting sections may flicker only a number of times of the value of the corresponding digit in descending order from the higher order digit to the lower order digit to inform the alarm code.

Since the alarm display may include a plurality of the lighting sections, each of the lighting sections may correspond to each digit of the natural number of the alarm code, and each of the lighting sections may flicker only a number of times of the value of the corresponding digit in descending order from the higher order digit to the lower order digit to inform the alarm code according to the above arrangement, operators can understand the alarm code easily within a short length of time.

For example, when the alarm code is "28", one lighting section corresponding to tens digit of the alarm code flickers twice, then another lighting section corresponding to ones digit of the alarm code flickers eight times to inform the alarm code.

If there is only one lighting section, it has to flicker twenty-eight times. However, the present arrangement provides the alarm display that includes a plurality of the lighting sections and each of the lighting sections corresponds to each digit of the natural number of the alarm code, which can display the alarm code by flickering only ten times (i.e. twice and eight times). Therefore, operators can be informed with the natural number of the alarm code within a short length of time. Further, operators can easily understand the alarm code since one lighting section corresponding to tens digit of the alarm code flickers first, then another lighting section corresponding to ones digit of the alarm code flickers subsequently.

In the above arrangement, each of the lighting sections may preferably have a different emitting-color.

According to the above arrangement, operators can easily distinguish a plurality of the lighting sections that correspond to each digit of the natural number of the alarm code since each of the lighting sections has a different emitting color. Consequently, operators can better understand the alarm code.

In the above arrangement, the lighting sections are preferably light-emitting diodes.

According to the above arrangement, since the lighting sections are easily available and inexpensive light-emitting diodes, production cost of the drive control device can be saved.

BRIEF DESCRIPTION OF THE DRAWINGS

FIG. 3 is an illustration how the drive control device according to the embodiment displays the alarm code.

DETAILED DESCRIPTION OF PREFERRED EMBODIMENT(S)

An embodiment of the present invention will be described below with reference to accompanying drawings.

Figure 1:
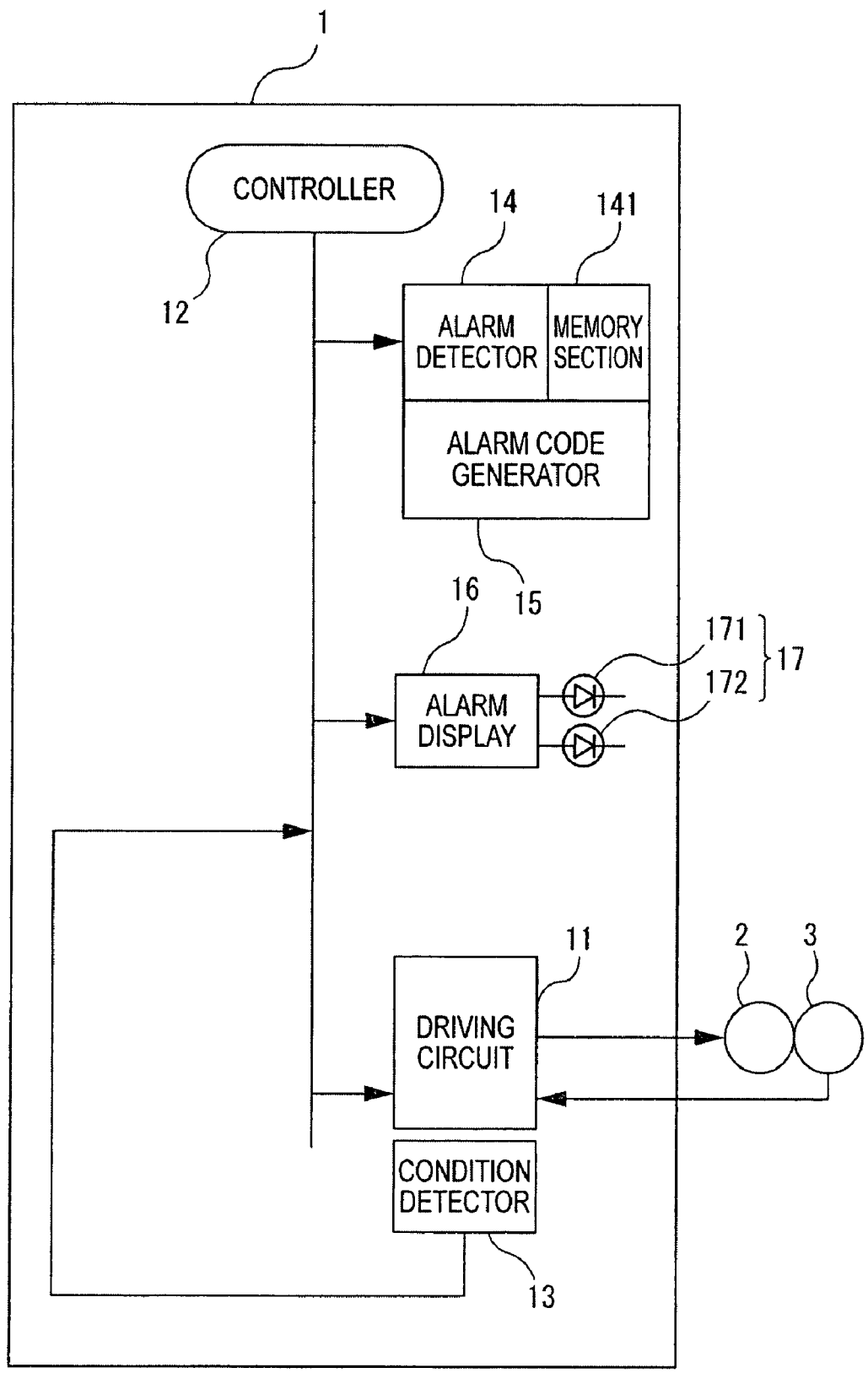
FIG. 1 is an illustration of an internal configuration of a drive control device according to an embodiment of the present invention.

FIG. 1 is an illustration of an internal configuration of a drive control device 1 according to the embodiment.

As shown in FIG. 1, the drive control device 1 is connected to a driving source 2 and an external condition detector 3. The external condition detector 3 is a device for detecting the condition of the driving source 2 to output a condition signal thereof. The driving source 2 is a motor and the like. The external condition detector 3 is an encoder for detecting rotation of the motor and the like.

The drive control device 1 includes a driving circuit 11 to drive the driving source 2, a controller 12 to control the driving circuit 11 and a condition detector 13 to detect the condition of the driving circuit 11.

The driving circuit 11 is a circuitry to drive the driving source 2 and is connected to the external condition detector 3.

The controller 12 controls the driving circuit 11 based on the difference between the condition of the driving source 2 indicated by the condition signal output from the external condition detector 3 and the desired condition so that the condition of the driving source 2 becomes closer to the desired condition.

The condition detector 13 is a device to detect the condition of the driving circuit 11 to output a condition signal thereof, which may be, for instance, a thermometer, a voltmeter and an ammeter which respectively detect temperature, voltage and current of the driving circuit 11.

The drive control device 1 further includes an alarm detector 14 to detect an occurrence of an alarm based on the condition signal output from the condition detector 13 and the external condition detector 3, an alarm code generator 15 to analyze the alarm detected by the alarm detector 14 in order to generate an alarm code, and an alarm display 16 to display the alarm code generated by the alarm code generator 15.

The alarm detector 14 has a memory section 141 to store predetermined alarm conditions. When the condition signal output from the condition detector 13 and the external condition detector 3 corresponds to one of the alarm conditions, the alarm detector 14 detects an occurrence of an alarm and sends the corresponding alarm condition to the alarm code generator 15.

The alarm condition can be a sudden change of current or voltage of the driving circuit 11, overheat of the driving circuit 11, overspeed of the driving source 2 and the like.

The memory section 141 further stores a code table that indicates correspondence between the predetermined alarm conditions and the alarm codes.

The alarm code generator 15 refers to the code table stored in the memory section 141 to generate an alarm code that corresponds to the alarm condition sent by the alarm detector 14. The alarm codes generated in the embodiment are two-digit natural numbers.

The alarm display 16 has two lighting sections 17 to display the alarm code generated by the alarm code generator 15 according to lighting patterns of the two lighting sections 17.

One of the two lighting sections 17 is a green light-emitting diode 171 that corresponds to tens digit of an alarm code. The other of the two lighting sections 17 is a red light-emitting diode 172 that corresponds to ones digit of an alarm code.

Figure 2:
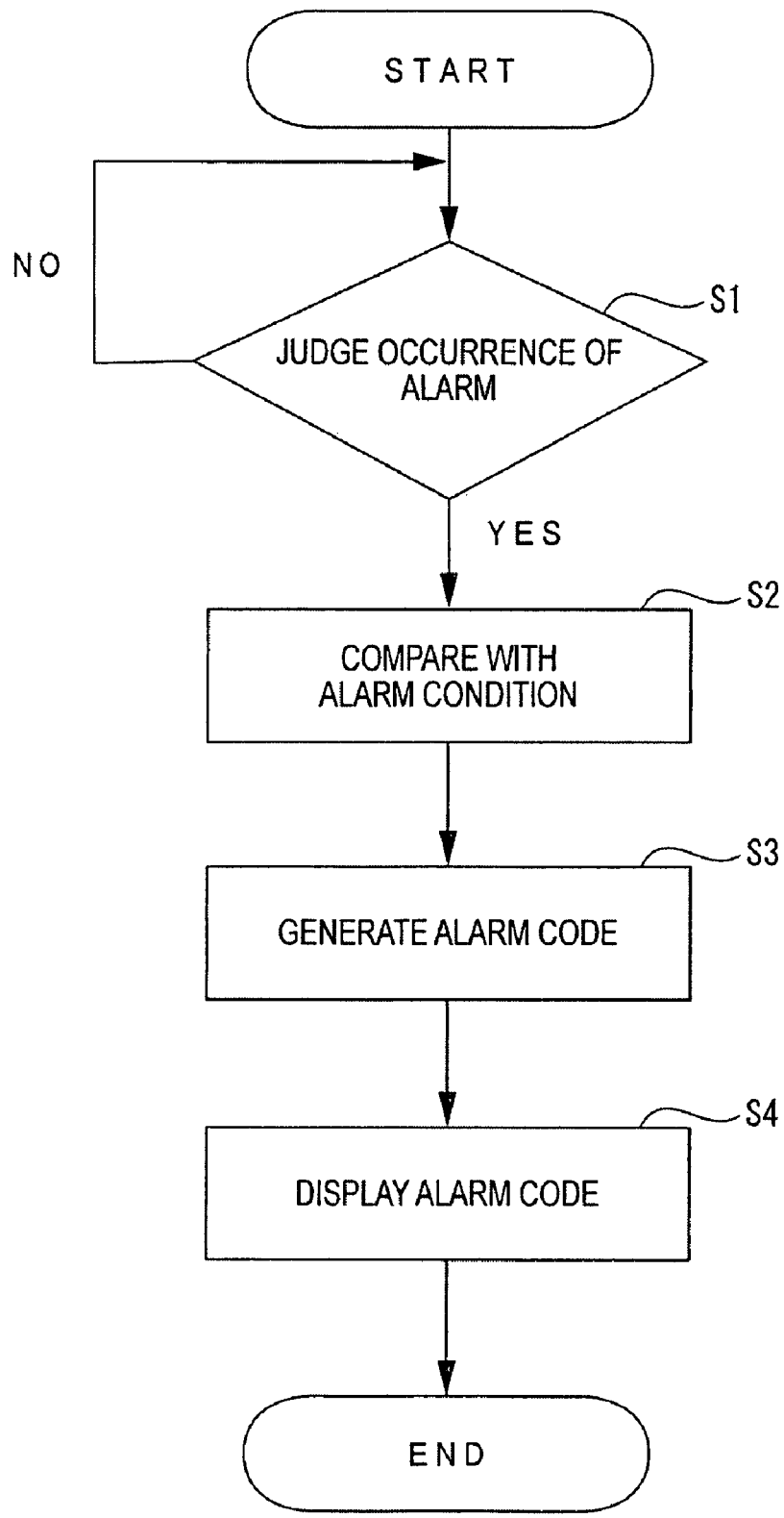
FIG. 2 is a flowchart of control when an alarm code is displayed on an alarm display of the drive control device according to the embodiment.

FIG. 2 shows a control flow when an alarm code is. displayed on the alarm display 16.

First, it is judged whether an alarm has been occurred or not (Step S1). Specifically, the alarm detector 14 shown in FIG. 1 compares the condition signal output from the condition detector 13 and the external condition detector 3 to the alarm conditions stored in the memory section 141. If the condition signal corresponds to one of the alarm conditions, the alarm detector 14 judges. that there is an occurrence of an alarm ("YES" of Step S1 in FIG. 2). If the condition signals do not correspond to any of the alarm conditions, the alarm detector 14 judges that there is no occurrence of an alarm ("NO" of Step S1 in FIG. 2). When an alarm is occurred, the occurrence of the alarm and the corresponding alarm condition are sent to the alarm code generator 15.

The alarm code generator 15 compares the code table stored in the memory section 141 to the alarm condition sent by the alarm detector 14 (Step S2) in order to select and generate an alarm code that corresponds to the alarm condition (Step S3). The alarm code generated as above is displayed on the alarm display 16 (Step S4).

Figure 3:
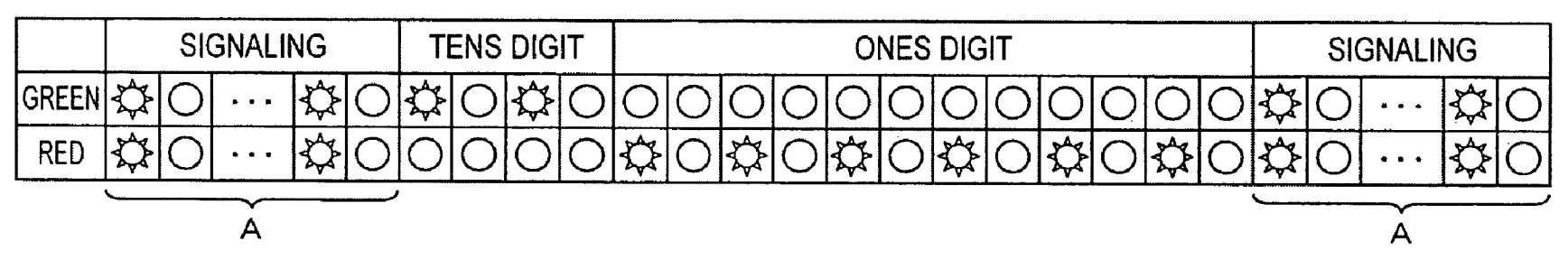

FIG. 3 illustrates how to display alarm codes on the alarm display 16.

The upper row in FIG. 3 shows a lighting condition of the green light-emitting diode 171 corresponding to tens digit of alarm codes and the lower row in FIG. 3 shows a lighting condition of the red light-emitting diode 172 corresponding to ones digit of alarm codes. Asterisk and circle respectively mean on and off of lighting. An initial condition is the condition in the next left column, which shifts to the lighting condition of the next right column after a given period of time. The alarm code shown in FIG. 3 is "26".

First, the lighting sections 17 are lighted by a predetermined lighting pattern A to signal an occurrence of an alarm. The lighting pattern A as shown in FIG. 3 in which the green light-emitting diode 171 and the red light-emitting diode 172 simultaneously flicker ten times is regarded as a signal-lighting in the present embodiment.

Next, the lighting sections 17 are lighted by another lighting pattern corresponding to the alarm code to inform the code. Specifically, only the green light-emitting diode 171 corresponding to tens digit of the alarm code flickers twice, then only the red light-emitting diode 172 corresponding to ones digit of the alarm code flickers six times.

Subsequently, there is another signal-lighting to inform the end of the display of the alarm code.

The present embodiment brings following advantages.

(1) Since the drive control device includes the alarm detector 14, the alarm code generator 15 and the alarm display 16 to display alarm codes, operators can specify the cause of the alarm based on the alarm code displayed on the alarm display 16 so as to deal with the alarm with ease.

(2) Since the alarm display 16 has the lighting sections 17 to display an alarm code based0 on the lighting pattern of the lighting sections 17. there is no need for the drive control device 1 to be connected to external equipments to display alarm codes and to be provided with a costly display unit such as a seven-segment display. Accordingly, the drive control device 1 is advantageous in its workability. Further, it can be inexpensively produced.

(3) The alarm codes are two-digit natural numbers and the lighting sections 17 flicker a number of times corresponding to the natural number of the alarm code (inform-lighting that informs the alarm code) after the lighting sections 17 are lighted with the predetermined lighting pattern A to signal the occurrence of the alarm. Accordingly, operators can be informed with the occurrence of the alarm by the signal-lighting and then can be informed with the alarm code by the number of times of flickering of the inform-lighting following the signal-lighting.

(4) The alarm display 16 has a plurality of the lighting sections 17. Each of the lighting sections 17 corresponds to each digit of the natural number of the alarm code, which flickers only a number of times of the value of the corresponding digit in descending order from the higher order digit to the lower order digit in order to inform the alarm code. Thus, operators can easily understand the alarm code within a short length of time.

(5) Each of the two lighting sections 17 has a different emitting color, where one of the two lighting sections 17 is the green light-emitting diode 171 and the other is the red light-emitting diode 172. Thus, operators can easily distinguish the two lighting sections 17 that correspond to each digit of the natural number of the alarm code from each other so as to better understand the alarm code.

(6) Since the lighting sections 17 are easily available and inexpensive light-emitting diodes, production cost of the drive control device 1 can be saved.

The scope of the present invention is not limited to the above embodiment but includes following modifications as long as an object of the present invention can be achieved.

(i) The configuration of the alarm display 16 is not limited to the one described in the above embodiment.

Figure 4:
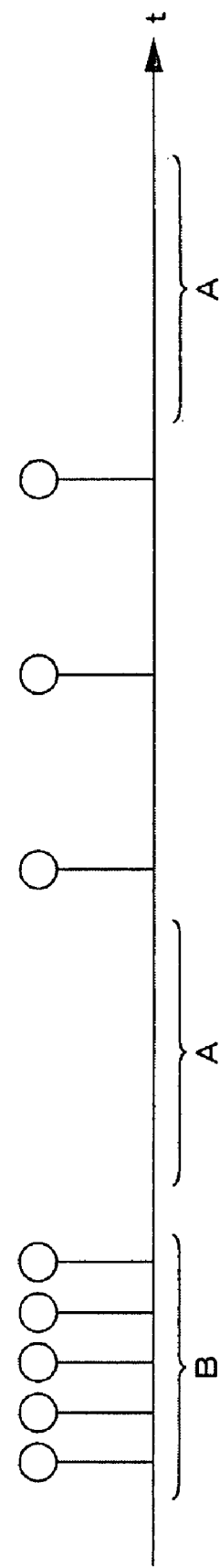
FIG. 4 is an illustration how a drive control device according to a modification of the present invention displays the alarm code.

For example, the lighting section 17 of the alarm display 16 may be configured to have only one light-emitting diode to display alarm codes as shown in FIG. 4.

The horizontal axis shows time passage and the vertical axis shows short lighting of the lighting section 17 in FIG. 4. The signal-lighting is a lighting pattern B (i.e. consecutive lightings of five times) in FIG. 4. Lightings of three times at a slow pace after the signal-lighting are the inform-lighting (i.e. the alarm code shown in FIG. 4 is three). There is a relatively long turned-off period A between the signal-lighting and the inform-lighting in order to clearly distinguish the signal-lighting from the inform-lighting.

In this case, since operators can specify the cause of the alarm based on the alarm code displayed on the alarm display 16, there is no need for the drive control device 1 to be connected to external equipments to display alarm codes and to be provided with a costly display unit such as a seven-segment display as well as the aforementioned embodiment.

Further, the lighting section 17 may be configured to have three light-emitting diodes or more. In this case, alarm codes of three digits or more can be displayed according to the same displaying method as the above embodiment.

Figure 5:
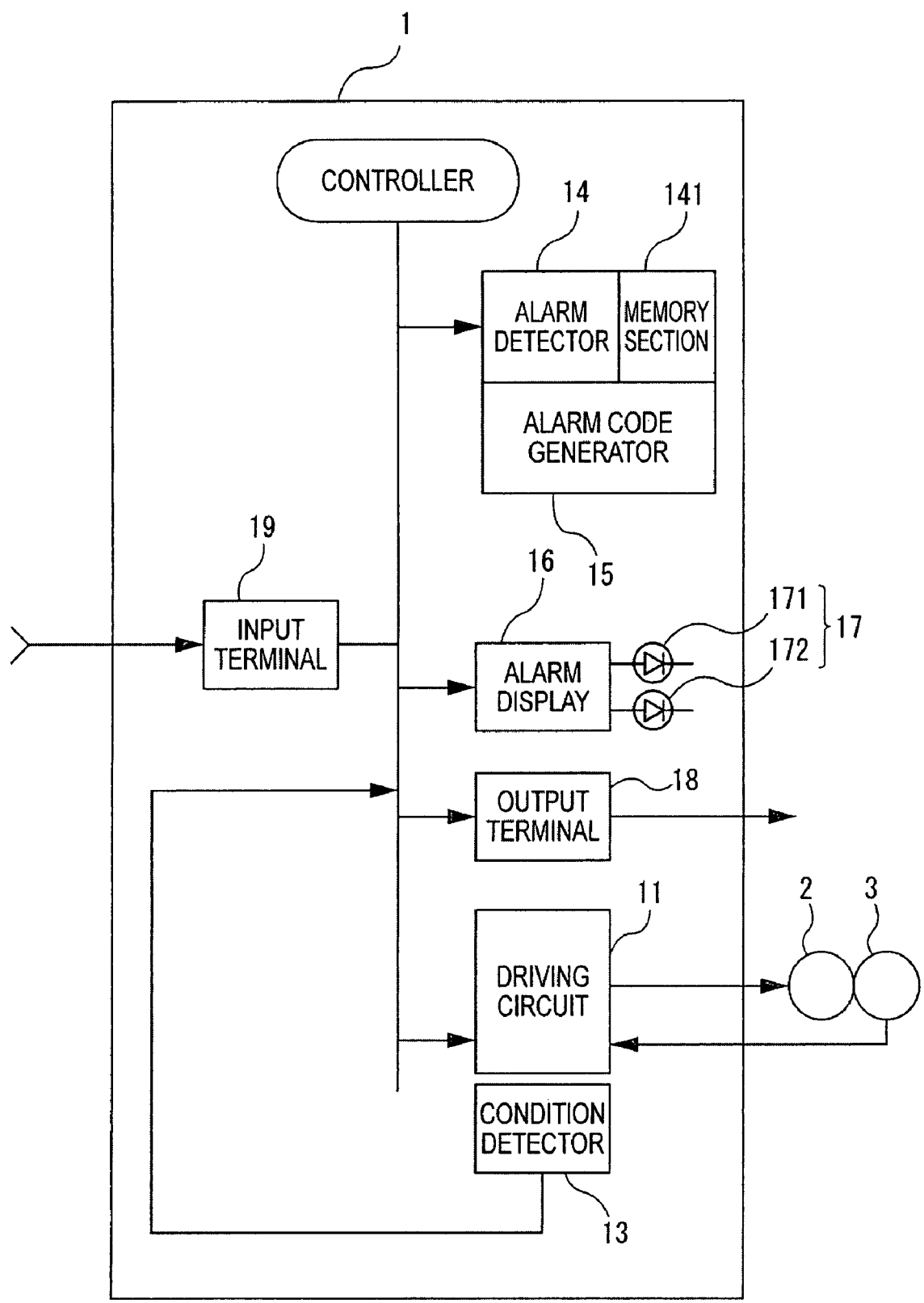
FIG. 5 is an illustration of an internal configuration of a drive control device according to another modification of the present invention.

(ii) As shown in FIG. 5, an output terminal 18 to output alarm codes to the external equipments may be provided to the drive control device 1. For example, if a computer is connected to the drive control device 1 as an external equipment, initiation times and causes of alarms can be continuously recorded and stored.

Further, an input terminal 19 to be connected to another external condition detector other than the external condition detector 3 may be provided to the drive control device 1 as shown in FIG. 5. For example, if another external condition detector that detects a variable different from those detected by the external condition detector 3 is connected, alarm occurrence can be detected based on the variable (i.e. from a different perspective).

The priority application Number JP 2006-313402 upon which this patent application is based is hereby incorporated by reference.

What is claimed is:

1. A drive control device, comprising:
   a driving circuit that drives a driving source;
   a condition detector that detects the condition of at least one of the driving source and the driving circuit to output a condition signal thereof;
   a controller that controls the driving circuit based on the condition signal;
   an alarm detector that detects an occurrence of an alarm based on the condition signal;
   an alarm code generator that analyzes the alarm detected by the alarm detector to generate an alarm code representing a natural number of one or more; and
   an alarm display that displays the alarm code generated by the alarm code generator with a lighting pattern of a lighting array, the lighting array comprising a plurality of lighting sections, each lighting section corresponding to one digit of the natural number of the alarm code,
   wherein after the lighting array is lit with a lighting pattern that indicates the occurrence of the alarm, the lighting sections are lit with another lighting pattern corresponding to the alarm code to inform the alarm code,
   all of the lighting sections corresponding to the digits of the alarm code are simultaneously lit when the occurrence of the alarm is indicated, and
   each lighting section flickers a number of times indicating the value of the corresponding digit in descending order from a higher order digit to a lower order digit of the alarm code to inform the alarm code.

2. The drive control device according to claim 1, wherein each of the lighting sections has a different emitting-color.

3. The drive control device according to claim 1, wherein the lighting section is a light-emitting diode.

* * * * *